United States Patent
Son et al.

(10) Patent No.: US 7,419,533 B2
(45) Date of Patent: Sep. 2, 2008

(54) SEPARABLE AIR PURIFYING APPARATUS

(75) Inventors: Bu Yeon Son, Yongin (KR); Jung Il Choi, Anyang (KR)

(73) Assignee: Winia Mando, Inc., Asan, Chungnam (KR)

( * ) Notice: Subject to any disclaimer, the term of this patent is extended or adjusted under 35 U.S.C. 154(b) by 482 days.

(21) Appl. No.: 11/049,942

(22) Filed: Feb. 4, 2005

(65) Prior Publication Data
US 2005/0172816 A1 Aug. 11, 2005

(30) Foreign Application Priority Data
Feb. 6, 2004 (KR) ............... 10-2004-0007991

(51) Int. Cl.
*B01D 35/30* (2006.01)
*B03C 3/01* (2006.01)
(52) U.S. Cl. ............... 96/55; 96/417; 55/342; 55/471; 55/482
(58) Field of Classification Search ............... 55/467, 55/471, 472, 342, 482; 96/55, 397, 417
See application file for complete search history.

(56) References Cited
FOREIGN PATENT DOCUMENTS
EP WO2004108248 * 12/2004
* cited by examiner

*Primary Examiner*—Robert A. Hopkins
(74) *Attorney, Agent, or Firm*—Fitzpatrick, Cella, Harper & Scinto

(57) ABSTRACT

A separable air purifying apparatus is provided, in which a number of purifiers whose purifying capabilities for particular pollutants are reinforced by each purifier are disposed in a space meeting each purifying characteristic in order to enable an independent operation for a custom-made purification, and are integrally combined with each other to thereby make a combination of a driving ratio of each purifier according to a degree of pollution and perform a combination operation of purification. The separable air purifying apparatus inhales external air by ventilation modules incorporated in respective cases and purifies the external air by filter members, to then discharge out the purified air. That is, the separable air purifying apparatus includes controllers controlling the ventilation modules and a main purifier and an auxiliary purifier each which are independently operated by respective power supplies. Here, an output terminal is formed in the main purifier and an input terminal is formed in the auxiliary purifier. When assembling the main and auxiliary purifiers, the input terminal of the auxiliary purifier is connected with the output terminal of the main purifier, to thus enable the controller of the main purifier to drive the ventilation module of the auxiliary purifier, and to accordingly enable a combination operation of the main and auxiliary purifiers.

7 Claims, 8 Drawing Sheets

SEPARABLE AIR PURIFYING APPARATUS

BACKGROUND OF THE INVENTION

1. Field of the Invention

The present invention relates to a separable air purifying apparatus, and more particularly, to a separable air purifying apparatus having a main purifier and a number of auxiliary purifiers, in which a number of purifiers whose purifying capabilities for particular pollutants are reinforced by each purifier are disposed in a space meeting each purifying characteristic in order to enable an independent operation for a custom-made purification, and are integrally combined with each other to thereby make a combination of a driving ratio of each purifier according to a degree of pollution and perform a combination operation of purification.

2. Description of the Related Art

In general, it has been known that indoor is more polluted than outdoor. This is due to a residence environment. An air-tight high heat isolation house or apartment house has a merit of heightening a cooling or heating effect, but has a defect that pollutants remain indoor for long in the case that indoor air is polluted. Considering that adults stay indoor for average twenty hours daily, indoor pollution should be severely reconsidered.

Indoor pollutants are enumerated from falling dust of about 100 μm or larger to floating pollutants such as pollen of 10-100 μm, finite dust of 25 μm or so, by-products of molds or mites of 10 μm or so, cigarette smokes of 0.001-1 μm or so.

In order to eradicate indoor pollutants or offensive odor, an air purifier has been developed. The air purifier is classified into a mechanical dust collection type and an electrical dust collection type largely, according to an operating type.

In more detail, the air purifier is sub-classified according to a minute particle removal type and an offensive odor removal type. According to the minute particle removal type, the air purifier is classified into an electric filtering type, an electric precipitating type, a negative ion generating type, a mechanical filtering type, and so on. According to the offensive odor removal type, the air purifier is classified into an ozone generating type, a carbon adsorbing type.

Among them, the electric dust collection type air purifier electrically charges floating matters in the air in a negative ion region due to corona discharge, and thus performs dust collection.

That is, if an ionized region by discharge is created and air is passed through the ionized area, microbes are killed by discharge and also dust is collected by a positive plate according to electric charge of minute matters.

Meanwhile, the mechanical dust collection type air purifier uses a combination of filters each having a particular function. For example, when a carbon adsorbing filter and a minute particle removal filter are combined, an offensive odor is removed by the carbon adsorbing filter, and bacteria or minute dust particles are removed by the minute particle removal filter.

A non-woven fabric filter which filters large sized dust simply, an active carbon filter which removes an offensive odor and a bad smell in the air, an antibacterial filter which removes various types of microbes such as fungi or virus, a HEPA filter (High Efficiency Particulate Arrestor filter) which is fabricated with a special fiber to be used in a clean room of a semiconductor company and filters minute dust and so on are used as the mechanical filter.

However, the conventional air purifier is installed in a space partitioned with walls or partitions in a bedroom, kitchen or living room, within a wide indoor space, and thus purifies air only in one space. That is, the conventional air purifier does not purifies all air in the whole indoor, and does not take an effective measure for pollution in a place distant from another where an air purifier is installed. As a result, polluted air is diffused indoor. Further, in order to purify the diffused polluted air, the air purifier should be overrun, to thereby cause loss of electric power.

SUMMARY OF THE INVENTION

To solve the above problems of the conventional art, it is an object of the present invention to provide a separable air purifying apparatus having a main purifier and a number of auxiliary purifiers whose purifying capabilities for particular pollutants are reinforced by each purifier so as to enable a combination or independent operation of the main and auxiliary purifiers, in which polluted air is purified by controlling driving ratios of the main and auxiliary purifiers according to a kind or degree of pollution during performing a combination operation of purification, and a purification efficiency of the polluted air is enhanced by disposing each purifier in a space meeting each purifying characteristic during performing an independent operation of purification.

It is another object of the present invention to provide a separable air purifying apparatus which performs a purification function at a region where pollution has taken place at a time of an independent operation of purification, to thus prevent an unnecessary overrun and thereby lower power consumption, and changes a combination of filters according to a characteristic of an installation place and thus increases a treatment capacity of pollution generated at the installation place, to thereby extend a filter life and enhance a purification efficiency.

It is still another object of the present invention to provide a separable air purifying apparatus which includes a replacement cover on the front surface of the air purifying apparatus so as to be harmoniously disposed with the peripheral indoor interior.

To accomplish the above object of the present invention, there is provided a separable air purifying apparatus which inhales external air by ventilation modules incorporated in respective cases and purifies the external air by filter members, to then discharge out the purified air, the separable air purifying apparatus comprising: controllers controlling the ventilation modules; and a main purifier and at least one auxiliary purifier each which are independently operated by respective power supplies, in which the auxiliary purifier is combined with the main purifier to thereby drive the ventilation module of the auxiliary purifier via the controller of the main purifier and thus enable a combination operation of the main and auxiliary purifiers.

Here, it is preferable that the auxiliary purifier further comprises an output terminal so that another auxiliary purifier is additionally connected therewith. It is preferable that the main purifier and the auxiliary purifier include a filter member characterized according to a pollution circumstance in an installation space, respectively. It is preferable that the main purifier and the auxiliary purifier further comprise a filter case accommodating the filter member, respectively.

Also, the main purifier and the auxiliary purifier include a display on which a running state thereof and a degree of pollution are indicated, respectively. Also, the main purifier and the auxiliary purifier further comprise an electric dust collector, respectively. Also, the main purifier and the auxiliary purifier further comprise a pollution detection sensor measuring a degree of pollution in the installation space, respectively.

In addition, the cases for the main and auxiliary purifiers are detachably combined on the front surface of the separable air purifying apparatus, to thereby form a replaceable interior front cover.

BRIEF DESCRIPTION OF THE DRAWINGS

The above objects and other advantages of the present invention will become more apparent by describing the preferred embodiment thereof in more detail with reference to the accompanying drawings in which.

DETAILED DESCRIPTION OF THE INVENTION

Figure 1A:
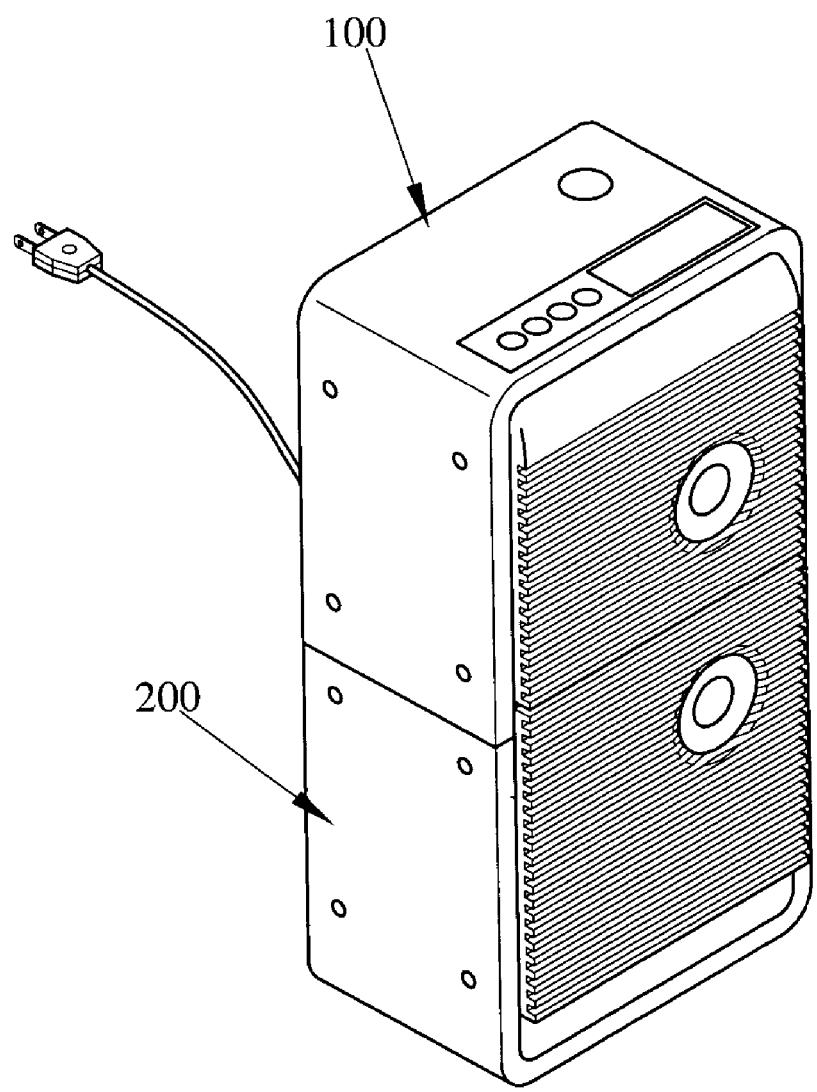
FIG. 1A is a perspective view showing a combined state of a separable air purifying apparatus according to the present invention.
Figure 1B:
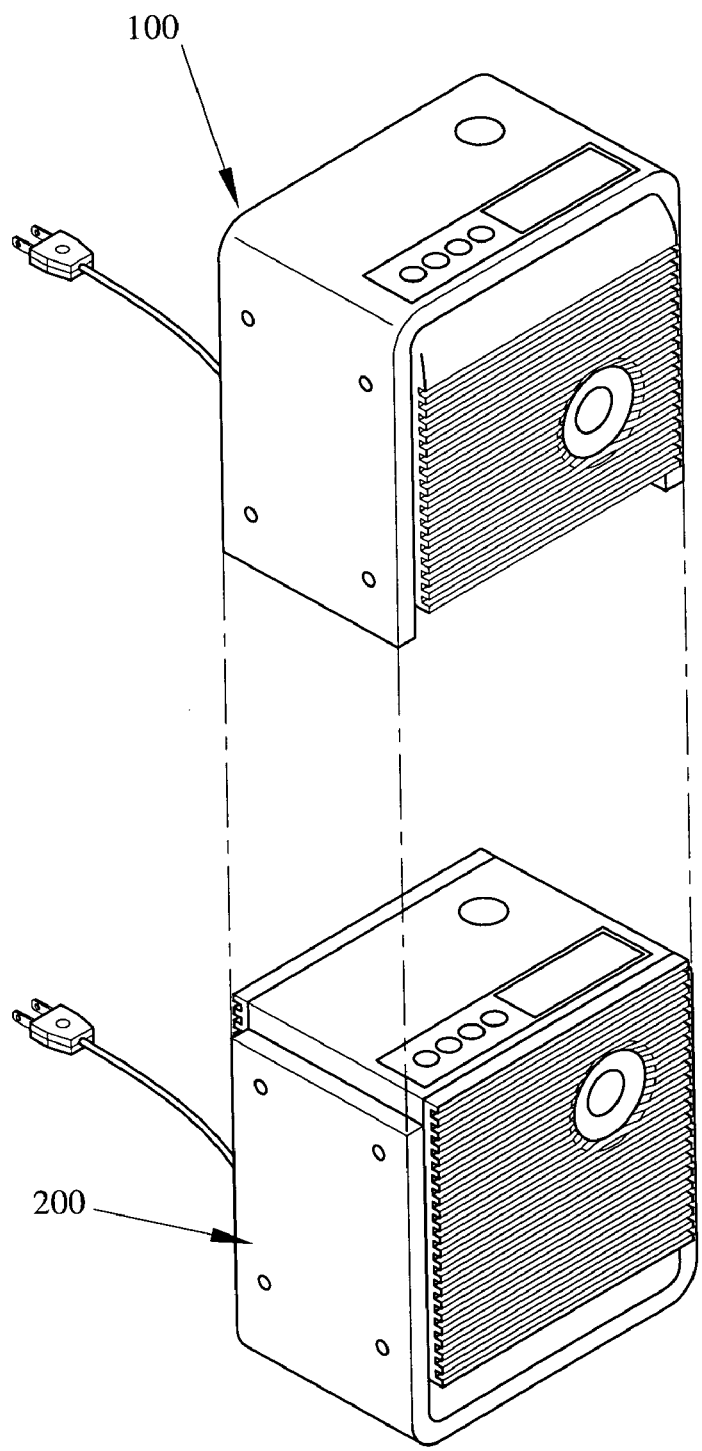
FIG. 1B is a perspective view showing a separated state of a separable air purifying apparatus according to the present invention.
Figure 2A:
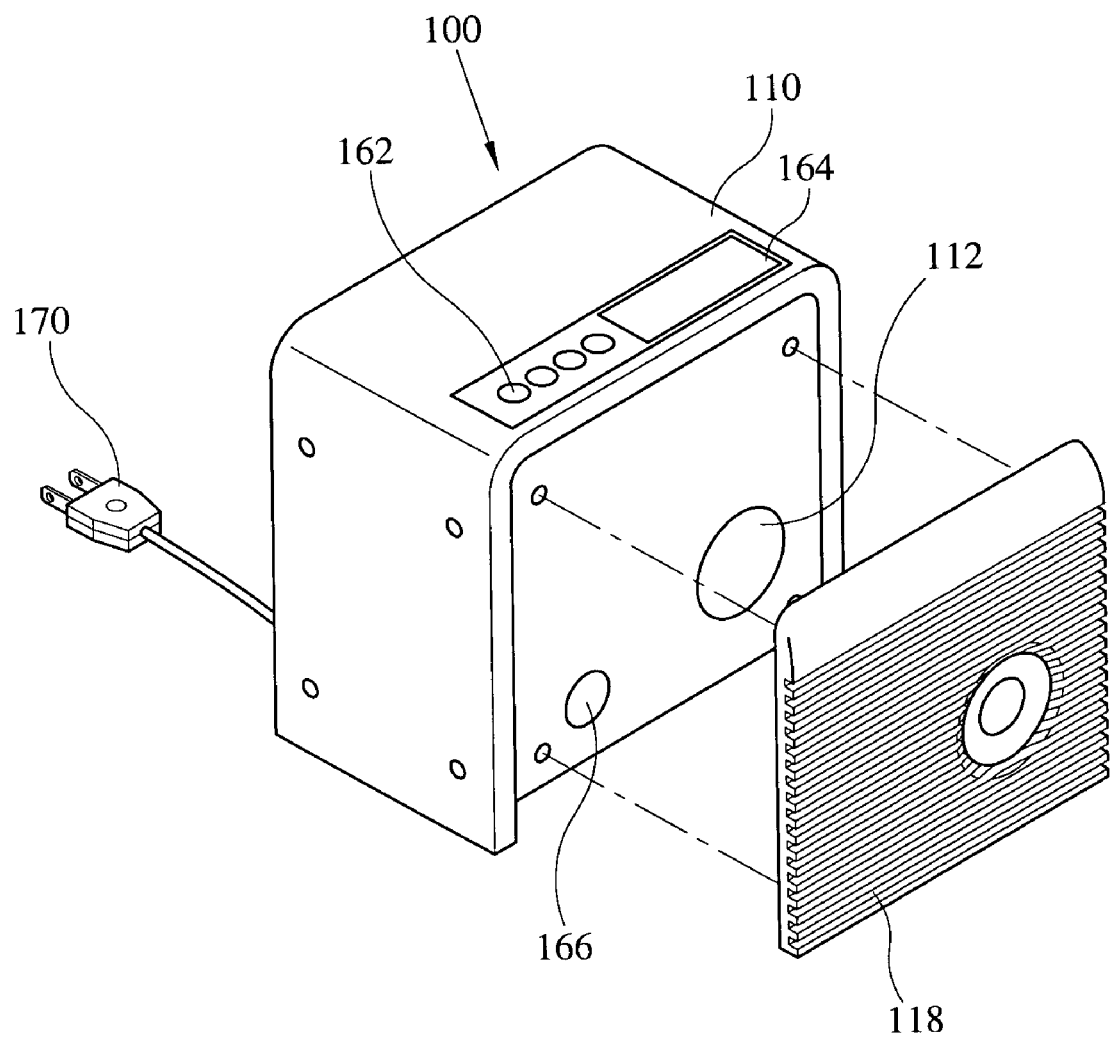
FIG. 2A is an extracted perspective view showing a main purifier of a separable air purifying apparatus according to the present invention.
Figure 2B:
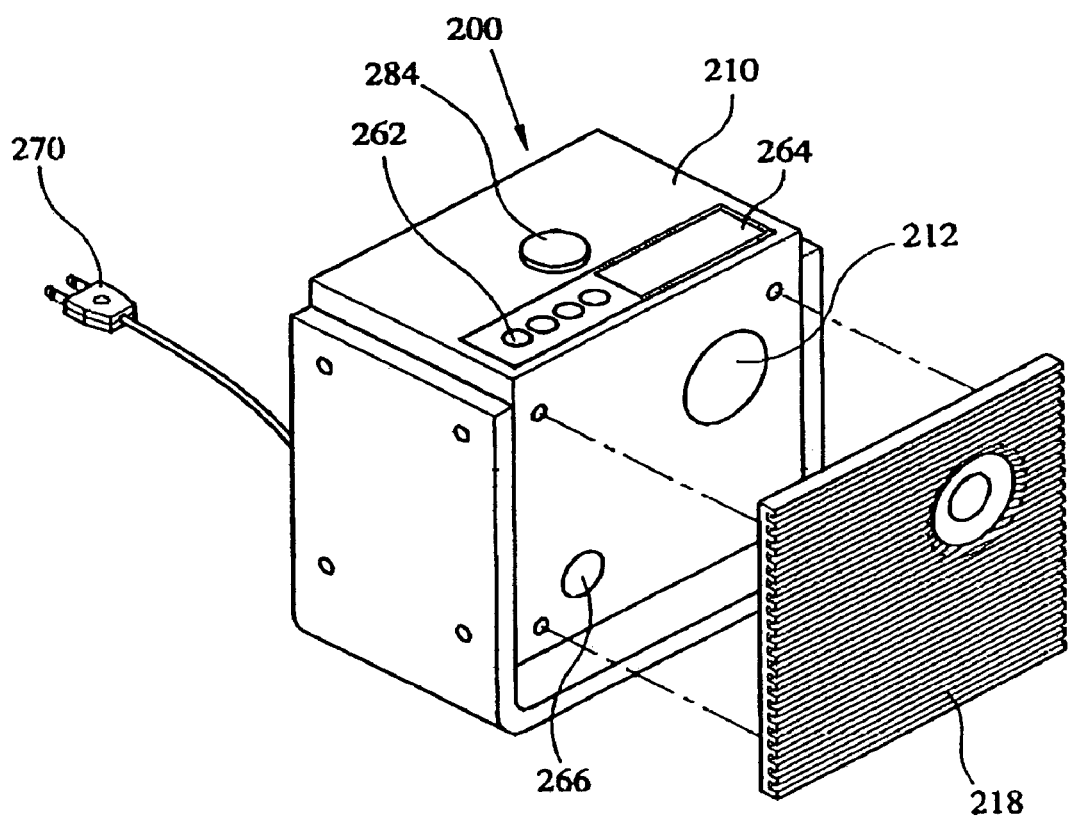
FIG. 2B is an extracted perspective view showing an auxiliary purifier of a separable air purifying apparatus according to the present invention.
Figure 3A:
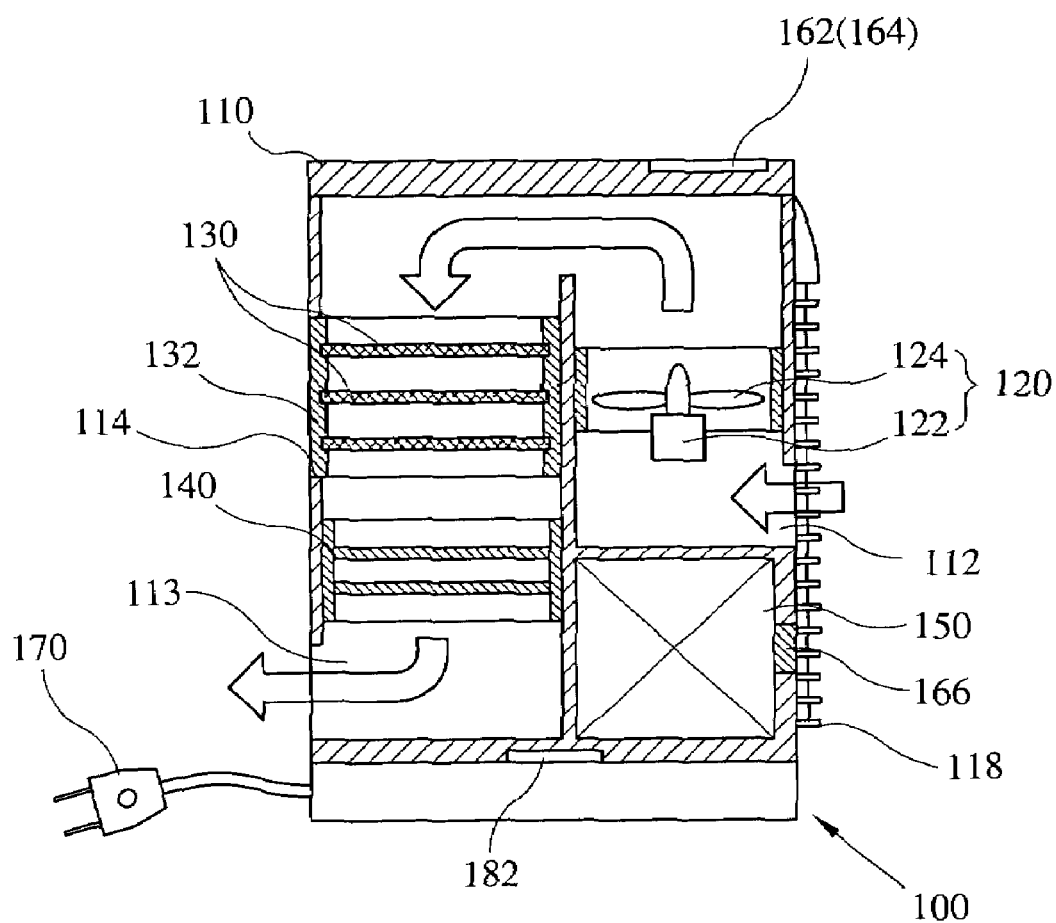
FIG. 3A is a cross-sectional view showing a main purifier of a separable air purifying apparatus according to the present invention.
Figure 3B:
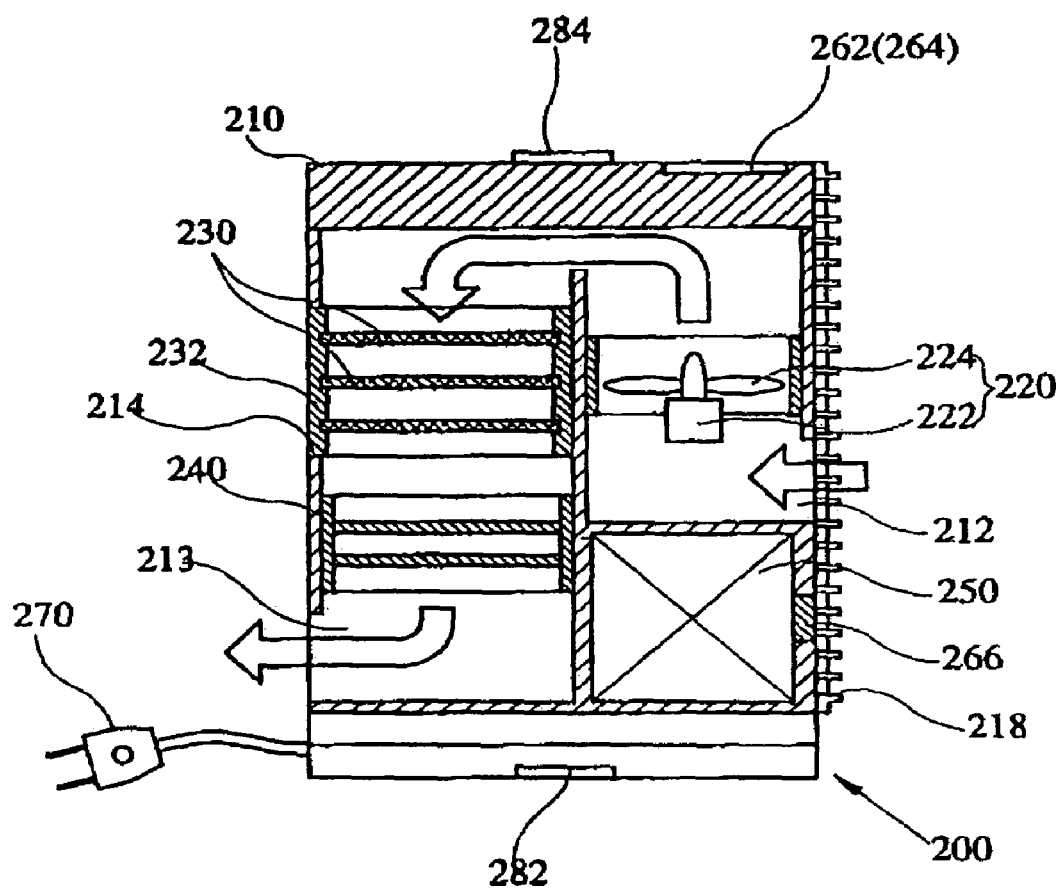
FIG. 3B is a cross-sectional view showing an auxiliary purifier of a separable air purifying apparatus according to the present invention.

A separable air purifying apparatus according to a preferred embodiment of the present invention will be described with reference to the accompanying drawings.

As shown in FIGS. 1A through 3B, a separable air purifying apparatus according to the present invention includes a main purifier 100 and an auxiliary purifier 200 which enable an independent operation and a combination operation thereof.

The main purifier 100 includes a case 110, a front cover 118 which is detachably attached on the front surface of the case 110, a ventilation module 120, a filter member 130, an electric dust collector 140, a controller 150, a power supply 170, and an output terminal 182 all of which are incorporated in the case 110.

The auxiliary purifier 200 includes a case 210, a front cover 218 which is detachably attached on the front surface of the case 210, a ventilation module 220, a filter member 230, an electric dust collector 240, a controller 250, a power supply 270, and an input terminal 284 all of which are incorporated in the case 210. Here, the auxiliary purifier 200 further includes an output terminal 282.

On the front surfaces of the respective cases 110 and 210 of the main and auxiliary purifiers 100 and 200 are formed inlets 112 and 212 which inhale external air and outlets 113 and 213 which discharge the inhaled air. On the rear surfaces of the respective cases 110 and 210 of the main and auxiliary purifiers 100 and 200 are formed filter insertion holes 114 and 214 into which filter cases 132 and 232 are inserted. On the upper and inner front surfaces of the respective cases 110 and 210 of the main and auxiliary purifiers 100 and 200 are formed operating panels 162 and 262 which enable a user to select a power supply switch and various functions of the purifiers 100 and 200, displays 164 and 264 on which operating states of the purifiers 100 and 200 are displayed, and pollution detection sensors 166 and 266 which measure a degree of pollution in the air in order to control a running rate of the purifiers 100 and 200, respectively.

Meanwhile, the front covers 118 and 218 are formed of a exchangeable panel color replacement type (TRIM KIT) structure which can be freely attached on and detached from the front surfaces of the cases 110 and 210 in the main and auxiliary purifiers 100 and 200 so as to match well an atmosphere of a space where the main and auxiliary purifiers 100 and 200 are installed.

The ventilation modules 120 and 220 are installed inwards from the inlets 112 and 212 in the cases 110 and 210, respectively, and inhale external air via the inlets 112 and 212 and send the inhaled air toward the outlets 113 and 213, which include ventilation fans 124 and 224 and ventilation motors 122 and 222 driving the ventilation fans 124 and 224, respectively.

The filter members 130 and 230 are disposed along a movable path of the air inhaled into the purifiers 100 and 200 and thus filter various foreign matters in the air, which can employ a non-woven fabric filter which filters dust in the air, an active carbon filter which removes an offensive odor in the air, an antibacterial filter which removes various types of microbes such as fungi or virus, a HEPA filter (High Efficiency Particulate Arrestor filter) which filters minute dust, and a combination thereof.

The filter members 130 and 230 are accommodated in the filter cases 132 and 232, respectively, and inserted and fixed in the cases 110 and 210 via the filter insertion holes 114 and 214 in the cases 110 and 210, which are formed of a combination of the filter members 130 and 230 which are characterized in matching a pollution environment in a space where each purifier is installed.

The electric dust collectors 140 and 240 are disposed in the rear sides of the filter members 130 and 230, respectively, which electrically charge floating matters in the air in a negative ion region due to corona discharge, and thus perform dust collection. That is, if an ionized region by discharge is created and air is passed through the ionized area, microbes are killed by discharge and also dust is collected by a positive plate according to electric charge of minute matters. Since the structures of the electric dust collectors 140 and 240 are well known, the detailed description thereof will be omitted.

The controllers 150 and 250 receive pollution detection signals from the pollution detection sensors 166 and 266 or operating signals from the operating panels 162 and 262, and control the ventilation modules 120 and 220 and the electric dust collectors 140 and 240, based on the received signals. In the case of a combination operation, the controller 150 in the main purifier 100 controls the ventilation module 220 and the electric dust collector 240 in the auxiliary purifier 200.

The power supplies 170 and 270 supply power to the main purifier 100 and the auxiliary purifier 200, respectively.

Meanwhile, the output terminal 182 in the main purifier 100 is connected with the input terminal 284 in the auxiliary purifier 200, so that power and a control signal can be transferred to the auxiliary purifier 200 from the main purifier 100. Since the auxiliary purifier 200 further includes the output terminal 282, another auxiliary purifier 200 can be subsequently connected therewith, so as to be controlled by the main purifier 100.

Hereinbelow, functions of the separable air purifying apparatus according to the present invention will be described.

First, functions of the main purifier 100 and the auxiliary purifier 200 will be described. In the case of the main purifier 100 and the auxiliary purifier 200, the pollution detection sensors 166 and 266 detect pollution. Then, the controllers 150 and 250 control the ventilation motors 122 and 222 of the ventilation modules 120 and 220 installed in the cases 110 and 210 to be driven, so that indoor polluted air is input into the cases 110 and 210 via the inlets 112 and 212 in the cases 110 and 210 by the rotational forces of the ventilation fans 124 and 224.

The inhaled polluted air circulates air moving paths in the cases 110 and 210 by the rotation of the ventilation fans 124 and 224, and passes through the filter members 130 and 230 inserted into the filter cases 132 and 232 to then be purified. Meanwhile, minute dust is removed by the electric dust collectors 140 and 240 disposed in the rear sides of the filter members 130 and 230, and then discharged via the outlets 113 and 213 out of the purifiers 100 and 200.

The driving of the purifiers 100 and 200 is initiated by the power supplied from the power supplies 170 and 270. Since the controllers 150 and 250 which receive the pollution detection signals from the pollution detection sensors 166 and 266 control the ventilation modules 120 and 220, respectively, a running rate of each of the purifiers 100 and 200 is automatically controlled.

Meanwhile, a manual control of each purifier can be performed through a manual operation of the operating panels 162 and 262 formed in the cases 110 and 210. Since a series of operations and a degree of pollution in the peripheral air can be displayed on displays 164 and 264, respectively, a user can catch up with an air purification state together with an operating state of each purifier at a glance.

The filter members 130 and 230 which purify air are accommodated at a predetermined interval in the filter cases 132 and 232 which are inserted via the filter insertion holes 114 and 214 formed in the cases 110 and 210. Since the filter members 130 and 230 are freely inserted into and detached from the filter cases 132 and 232, it is easy to replace or clean them. Also, since it is easy to make a combination of the filter members 130 and 230 according to a characteristic of an installation space, it is possible to perform a custom-made purification according to a degree of pollution in an installation space.

As described above, the separable air purifying apparatus having the main purifier 100 and the auxiliary purifier 200 can be used as a single purifier when the main and auxiliary purifiers 100 and 200 are combined with each other and integrally driven. Meanwhile, when the main purifier 100 and the at least one purifier 200 are separated from each other and the filter members 130 and 230 are combined according to a characteristic of an installation space, it is possible to perform a custom-made purification to thereby maximize an efficiency of air purification.

For example, in the case that the separable air purifying apparatus is installed in a children's room, filter members 130 and 230 which remove microbes and dusts are inserted into the filter cases 132 and 232 in combination. In the case that the separable air purifying apparatus is installed in an aged person's room, filter members 130 and 230 which remove bad smells and general dusts are inserted into the filter cases 132 and 232 in combination. In the case that the separable air purifying apparatus is installed in a living room, filter members 130 and 230 which remove dusts concentriatively are inserted into the filter cases 132 and 232 in combination. In this manner, a function of purification with respect to a particular pollution is intensified through a combination of the filter members 130 and 230 in the main and auxiliary purifiers 100 and 200 which are disposed and independently run according to a characteristic of an installation space, to thereby enhance a purification capability and prevent an unnecessary use of the filter members 130 and 230.

In addition, in the case of a combination operation of the main and auxiliary purifiers 100 and 200, the input terminal 284 of the auxiliary purifier 200 is inserted into the output terminal 182 of the main purifier 100 during assembly of the main and auxiliary purifiers 100 and 200, so that power of the main purifier 100 is supplied to the auxiliary purifier 200 and simultaneously a control signal is supplied from the main purifier 100 to the auxiliary purifier 200 to thereby enable the main purifier 100 to control the auxiliary purifier 200.

In addition, since the auxiliary purifier 200 further includes the output terminal 282, another auxiliary purifier 200 can be subsequently connected therewith, so that a control signal as well as power can be supplied from the main purifier 100 and the auxiliary purifier 200 can be controlled by the main purifier 100.

Meanwhile, the detachable front covers 118 and 218 are assembled on the front surfaces of the main and auxiliary purifiers 100 and 200. The front covers 118 and 218 are formed of a exchangeable panel color replacement type (TRIM KIT) structure whose color and material can be replaced by another so as to match well an atmosphere of a space where the main and auxiliary purifiers 100 and 200 are installed.

Figure 4A:
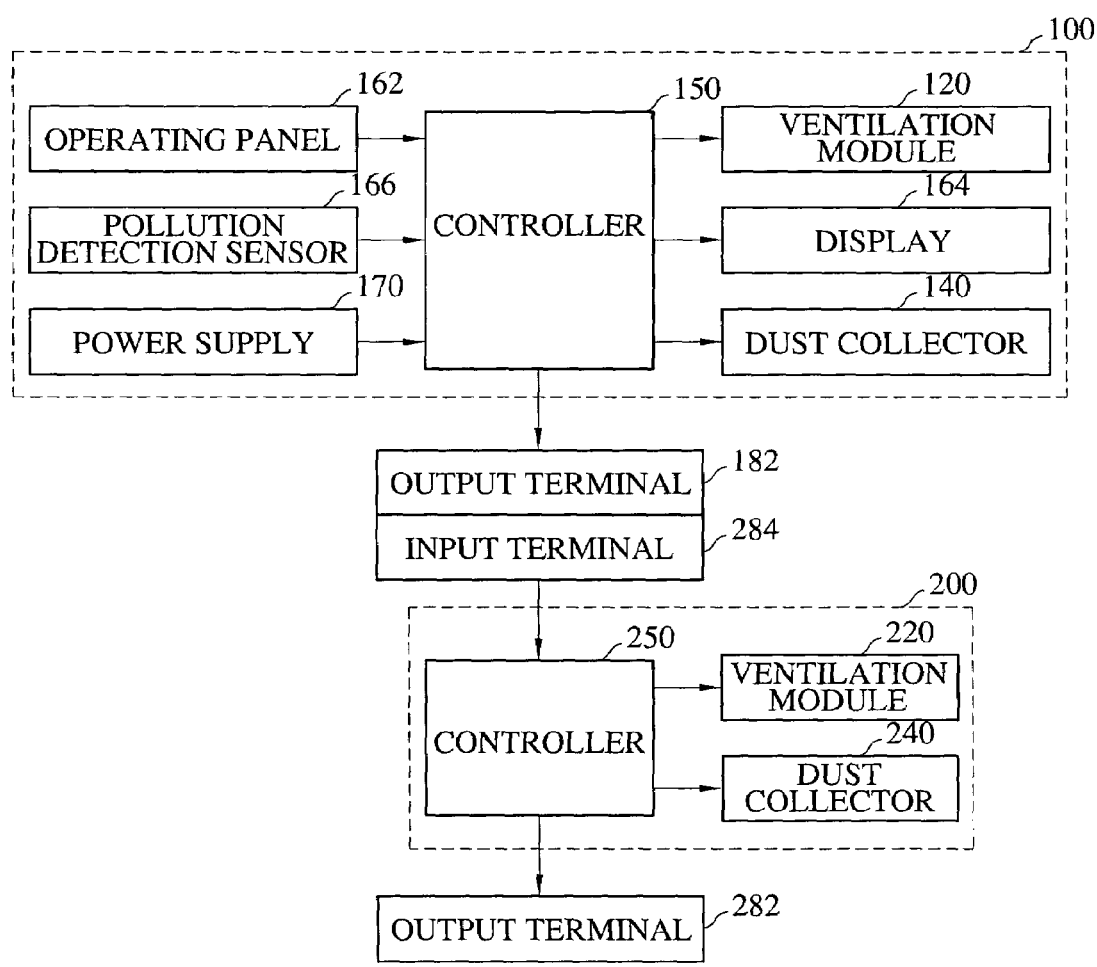
FIG. 4A is a block diagram showing a control system at the time of a combination operation of a separable air purifying apparatus according to the present invention.

FIG. 4A is a block diagram showing a control system at the time of a combination operation of a separable air purifying apparatus according to the present invention.

As shown in FIG. 4A, a pollution signal detected by a pollution detection sensor 166 in a main purifier 100 is sent to a controller 150. The controller 150 drives a ventilation module 120 and an electric dust collector 140 in the main purifier 100 based on the pollution signal and controls the main purifier 100 to perform a purification function. Power and a control signal are transferred to an auxiliary purifier 200 via an input terminal 284 in the auxiliary purifier 200 which is connected with an output terminal 182 in the main purifier 100, so that a controller 250 in the auxiliary purifier 200 controls a ventilation module 220 and an electric dust collector 240 in the auxiliary purifier 200 to be driven by a control signal from the main purifier 100.

In addition, since another auxiliary purifier 200 can be subsequently connected with an output terminal 282 in the auxiliary purifier 200, and thus a control signal and power can be subsequently transferred from the main purifier 100 to the subsequent auxiliary purifier 200, the at least one auxiliary purifier 200 can be operated in combination together with the main purifier 100.

Here, the controller 150 in the main purifier 100 controls a running rate of each of the ventilation modules 120 and 220 and the electric dust collectors 140 and 240 of each purifier 100 or 200, or drive only the ventilation modules 120 and 220 and the electric dust collectors 140 and 240 of a particular purifier 100 or 200, according to a kind of a pollution signal and a degree of pollution which is detected by the pollution detection sensors 166 and 266 which are installed in the main and auxiliary purifiers 100 and 200, to thereby perform a fuzzy operation of purifying air. The polluted air purification process and running rate of each purifier are displayed on a display 164 to have a user recognize them.

The main and auxiliary purifiers 100 and 200 which are automatically controlled according to the detection signals detected by the pollution detection sensors 166 and 266 can be manually controlled by a user manual operation of an operating panel 162 in the main purifier 100.

Figure 4B:
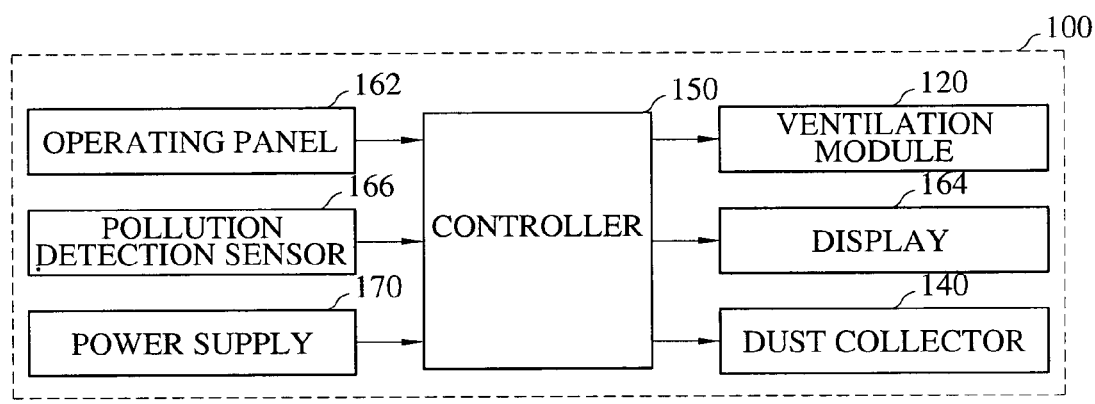
FIG. 4B is a block diagram showing a control system at the time of an independent operation of a separable air purifying apparatus according to the present invention.
Figure 4B:
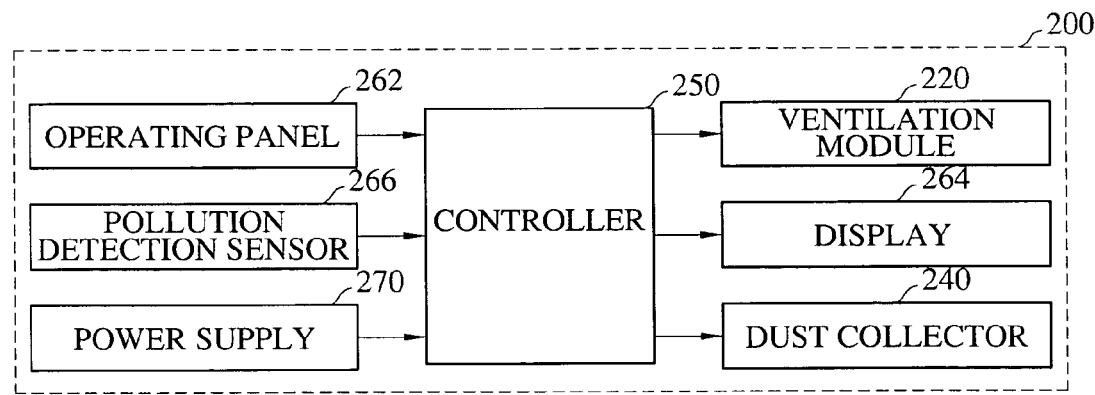

FIG. 4B is a block diagram showing a control system at the time of an independent operation of a separable air purifying apparatus according to the present invention.

As shown in FIG. 4B, the main purifier 100 is separated from the auxiliary purifier 200. The main purifier 100 is installed in a particular space, different from another for the auxiliary purifier 200. The main purifier 100 and the auxiliary purifier 200 which receive power from power supplies 170 and 270, respectively is independently driven.

According to an operating principle of each purifier, when pollution signals are detected via the pollution detection sensors 166 and 266, and then the pollution signals are sent to the controllers 150 and 250, the ventilation modules 120 and 220 and the electric dust collectors 140 and 240 are driven by the controllers 150 and 250, in order to purify polluted air and display the operating states of each purifier on the displays 164 and 264.

As described above, the main purifier 100 and the auxiliary purifier 200 can be automatically controlled by the pollution detection sensors 166 and 266, and can be manually controlled by a control signal input via the operating panels 162 and 262.

As described above, the separable air purifying apparatus according to the present invention includes filter members 130 and 230 which can be installed in combination thereof, so that the main purifier 100 and the at least one auxiliary purifier 200 intensify a function of purifying a particular pollutant, respectively. As a result, polluted air is purified by controlling driving ratios of the main and auxiliary purifiers according to a kind or degree of pollution during performing a combination operation of purification, and a purification efficiency of the polluted air is enhanced through a combination of the filter members 130 and 230 according to a pollution environment of a space where each purifier is disposed to thereby perform a custom-made purification according to an installation space during performing an independent operation of purification.

As described above, a separable air purifying apparatus according to the present invention includes a main purifier and a number of auxiliary purifiers whose purifying capabilities for particular pollutants are reinforced by each purifier so as to enable a combination or independent operation of the main and auxiliary purifiers, in which polluted air is purified by controlling driving ratios of the main and auxiliary purifiers according to a kind or degree of pollution during performing a combination operation of purification, and a purification efficiency of the polluted air is enhanced by disposing each purifier in a space meeting each purifying characteristic during performing an independent operation of purification.

Also, the separable air purifying apparatus performs a purification function at a region where pollution has taken place at a time of an independent operation of purification, to thus prevent an unnecessary overrun and thereby lower power consumption, and changes a combination of filters according to a characteristic of an installation place and thus increases a treatment capacity of pollution generated at the installation place, to thereby extend a filter life and enhance a purification efficiency.

Also, the separable air purifying apparatus includes a replacement cover on the front surface of the air purifying apparatus so as to be harmoniously disposed with the peripheral indoor interior.

What is claimed is:

1. A separable air purifying apparatus which inhales external air, purifies the external air by filter members, and then discharges out the purified air, the separable air purifying apparatus comprising:
   a plurality of ventilation modules;
   controllers in said ventilation modules for controlling the ventilation modules;
   a main purifier in one of said modules and at least one auxiliary purifier in another of said modules, said purifiers each being independently operated by respective power supplies,
   wherein the main purifier includes an output terminal and the auxiliary purifier includes an input terminal, whereby the input terminal of the auxiliary purifier may be joined to the output terminal of the main purifier during assembly of the main and auxiliary purifiers, to thereby drive the ventilation module of the auxiliary purifier via the controller of the main purifier and thus enable a combination of operation of the main and auxiliary purifiers, and
   wherein the main purifier and the auxiliary purifier include a display on which a running state thereof and a degree of pollution are indicated, respectively.

2. The separable air purifying apparatus according to claim 1, wherein the auxiliary purifier further comprises an output terminal whereby another auxiliary purifier may be connected therewith.

3. The separable air purifying apparatus according to either claim 1 or claim 2, wherein the main purifier and the auxiliary purifier include a filter member selected according to a pollution circumstance in installation space, respectively.

4. The separable air purifying apparatus according to claim 1, wherein the main purifier and the auxiliary purifier further include a filter case accommodating the filter member, respectively.

5. The separable air purifying apparatus according to claim 1, wherein the main purifier and the auxiliary purifier further include an electric dust collecting apparatus, respectively.

6. The separable air purifying apparatus according to claim 1, wherein the main purifier and the auxiliary purifier further include a pollution detection sensor measuring a degree of pollution in the installation space, respectively.

7. The separable air purifying apparatus according to claim 1, wherein the cases for the main and auxiliary purifiers are detachably combined on the front surface of the separable air purifying apparatus, to thereby form a replaceable interior front cover.

* * * * *